United States Patent [19]
Nakamura

[11] Patent Number: 5,727,223
[45] Date of Patent: Mar. 10, 1998

[54] DOCUMENT PROCESSING APPARATUS

[75] Inventor: Kazuhiro Nakamura, Tanashi, Japan

[73] Assignee: Canon Kabushiki Kaisha, Tokyo, Japan

[21] Appl. No.: 219,859

[22] Filed: Mar. 28, 1994

Related U.S. Application Data

[63] Continuation of Ser. No. 634,706, Dec. 27, 1990, abandoned.

[30] Foreign Application Priority Data

Dec. 29, 1989 [JP] Japan .................................. 1-344927

[51] Int. Cl.[6] ......................................... G06F 17/21
[52] U.S. Cl. ..................... 395/788; 395/789; 395/109; 400/9
[58] Field of Search .......................... 395/144, 145, 395/106, 109, 110, 102, 112, 117, 128, 761, 769, 780, 781, 791, 788–789, 793; 345/132, 1–6; 400/126, 120, 8, 9, 12, 83; 382/49–45, 47–48, 286

[56] References Cited

U.S. PATENT DOCUMENTS

| | | | |
|---|---|---|---|
| 4,655,622 | 4/1987 | Aoki | 400/121 |
| 4,733,351 | 3/1988 | Peirent | 364/200 |
| 4,763,279 | 8/1988 | Kellam et al. | 395/109 |
| 4,801,951 | 1/1989 | Shimazaki | 346/140 R |
| 4,901,248 | 2/1990 | Ueno et al. | 364/519 |
| 4,907,193 | 3/1990 | Masaki | 364/900 |
| 4,924,409 | 5/1990 | Fukunaga | 364/518 |
| 5,040,913 | 8/1991 | Folkens et al. | 400/718.1 |
| 5,119,081 | 6/1992 | Ikehira | 340/723 |
| 5,220,623 | 6/1993 | Yagasaki et al. | 382/45 |

FOREIGN PATENT DOCUMENTS 0 042 045  12/1981  European Pat. Off. .
0080200  6/1983  European Pat. Off. .

OTHER PUBLICATIONS

Research Disclosure, "Expand Text Field", No. 25006, Feb. 1985.
IBM Technical Disclosure Bulletin, "Ragged Right Manipulation of Right Justified Text", vol. 28, No. 9, pp. 4176–4178, Feb. 1986.
IBM Technical Disclosure Bulletin, "Context–Dependent Character Image Formation", vol. 29, No. 10, pp. 4404–4405, Mar. 1987.
IBM Technical Disclosure Bulletin, "Data Display and Proportional Spacing", vol. 29, No. 12, pp. 5472–5478, May 1987.

*Primary Examiner*—Joseph H. Feild
*Attorney, Agent, or Firm*—Fitzpatrick, Cella, Harper & Scinto

[57] ABSTRACT

A document processing apparatus includes a display unit for visually displaying a character train, a generating unit for generating display position information on the display unit on the basis of visualization position information corresponding to a character pitch of a visualizing unit having a resolution different from that of the display unit, a detecting unit for detecting a punctuation in the character train, and a control unit for controlling the generating unit to perform matching between the position information caused by a difference between the resolutions on the basis of punctuation detection performed by the detecting unit.

20 Claims, 6 Drawing Sheets

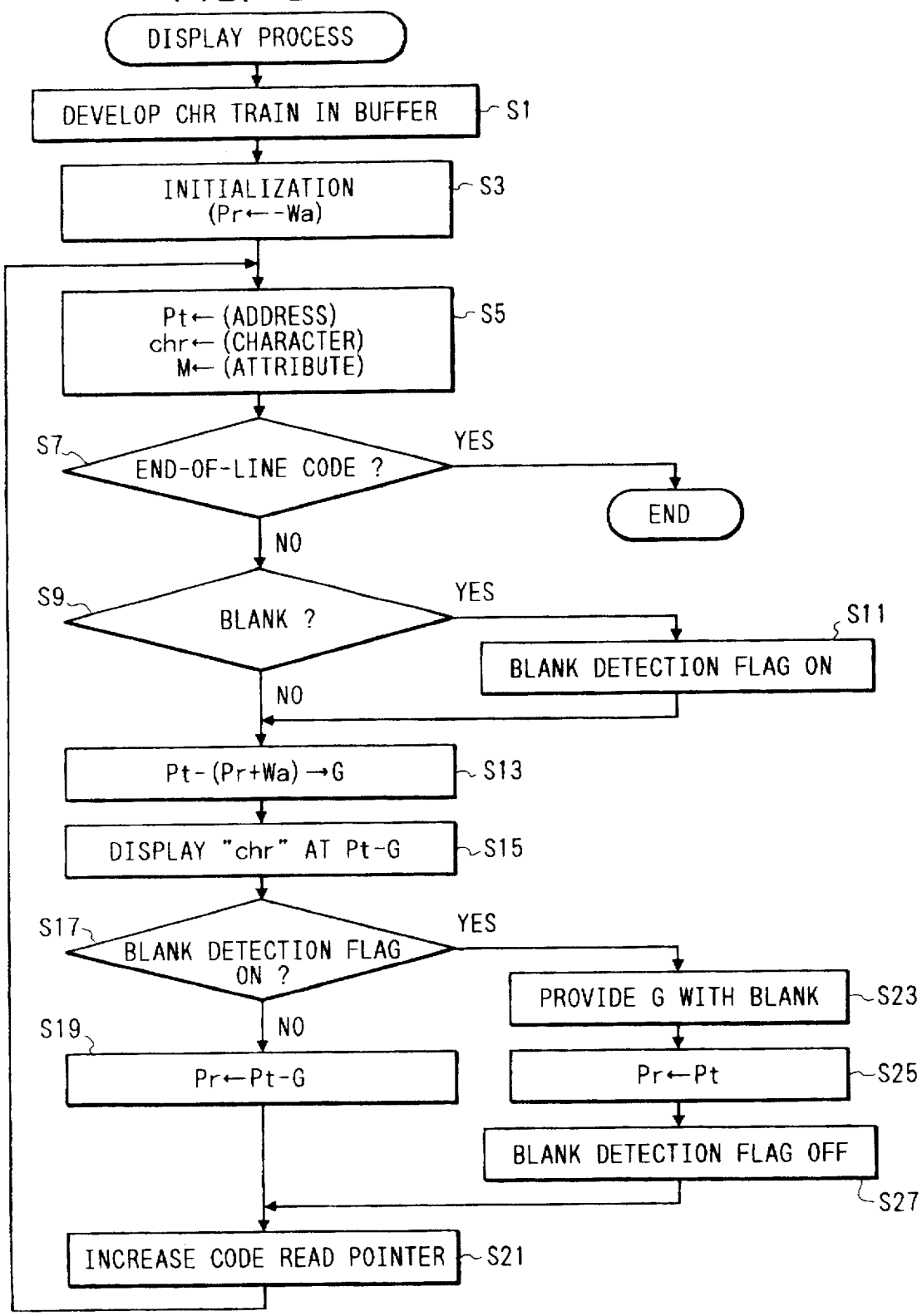

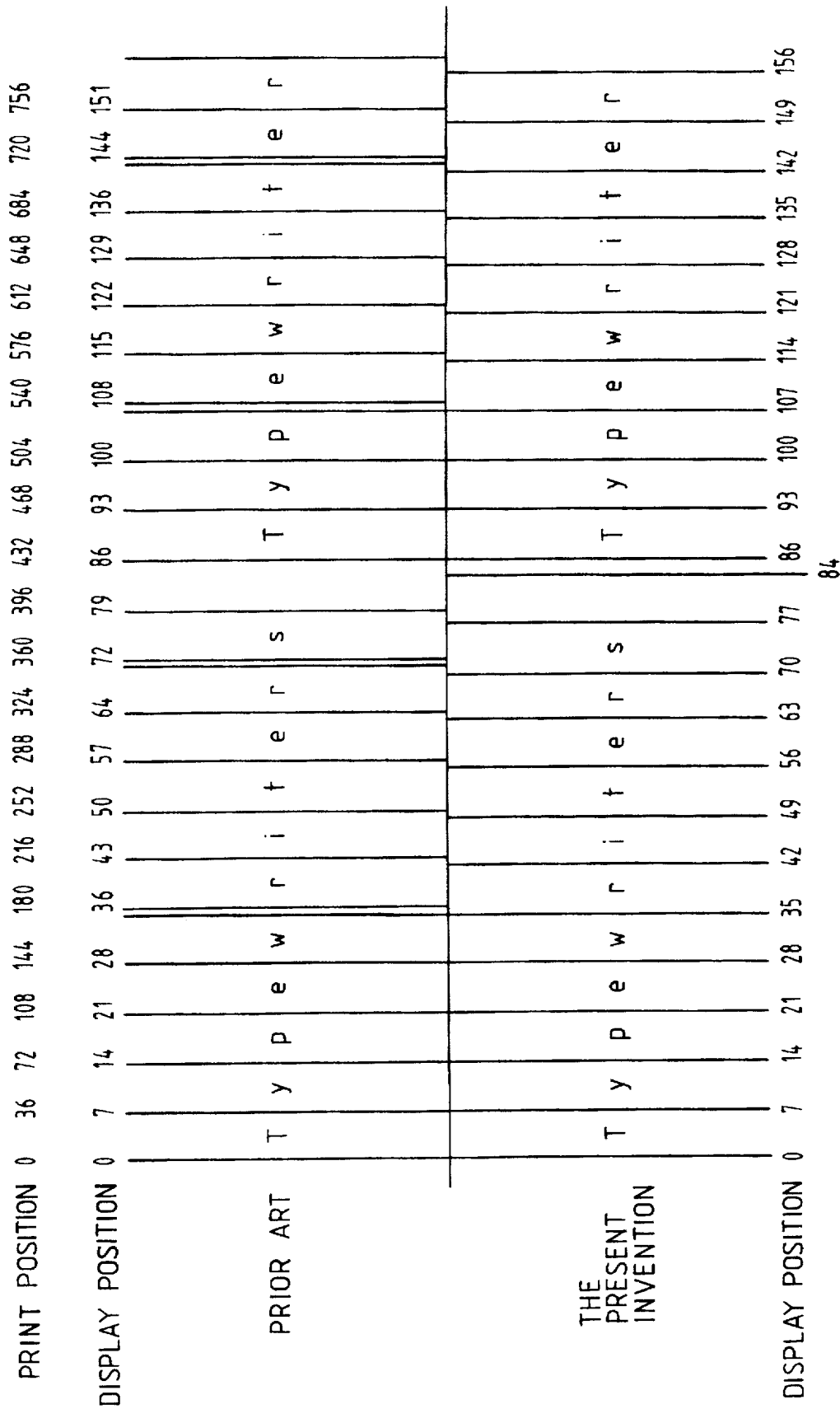

DOCUMENT PROCESSING APPARATUS

This application is a continuation of application Ser. No. 07/634,706 filed Dec. 27, 1990, now abandoned.

BACKGROUND OF THE INVENTION

1. Field of the Invention

The present invention relates to a document processing apparatus and, more particularly, to a document processing apparatus having a printing means and a display means as a visualizing means for a document.

2. Related Background Art

In general, resolutions (numbers of dots constituting data) upon data visualization are often different between a printing means and a display means. When both the means are to be used in a certain document processing system, therefore, no problem is posed if an exclusive data developing means is provided for each means to perform dot development of data suitable for the means, thereby performing visualization. In order to simplify a system arrangement or to decrease a manufacturing cost of the system, however, a dot developing means suitable for one of the two visualizing means, i.e., a visualizing means (normally, a printing means) having a higher resolution is preferably used to form to-be-visualized data (to-be-displayed data) of the other means by thinning to-be-developed dots of the visualizing means.

In order to visualize a character train such as characters or numerals, since a character pitch is determined in accordance with the type of visualizing means, a character visualization position (a print position and a display position) in the horizontal direction must be determined in accordance with the character pitch. Since a character pitch changes in accordance with a resolution, however, a visualization position determined on the basis of a character pitch (represented by the number of dots in the horizontal direction) of a visualizing means having a higher resolution is divided by a value corresponding to a resolution ratio, and the quotient is determined as a character visualization position for the other visualizing means. For example, if a resolution ratio of a printing means to a display means is 5:1, a value obtained by dividing a print position determined for the printing means by "5" is used as a display position for the display means.

A resolution ratio of the resolution of a printing means to that of a display means, however, cannot be often represented by a simple integer ratio. For this reason, if the above division is performed by a value corresponding to the closest integer value and the remainder is omitted, an extra display space corresponding to one dot is sometimes formed between a certain display position and the next display position.

More specifically, as shown in FIG. 6, assuming that a printing character pitch is "36" and a display character pitch is "7" (a resolution ratio is therefore about 5:1), when print position information corresponding to a dot number of printing from the left end is "144", corresponding display position information is "28". Similarly, when the print position information is "180", the display position information is "36". As a result, an extra space of one dot is formed with respect to "7" as the original character pitch of display.

When a character train is to be displayed, data to be written in a display buffer or the like may not always erase all of display data previously written in the buffer upon designation of a display position. That is, if a space of one dot is formed as described above and already displayed data (previous data) is as shown in FIG. 6, the previous data is sometimes not erased but remains on a portion of the one-dot space.

In order to prevent such an inconvenience in a conventional apparatus, a main controller or the like of the apparatus sends blank data to erase the entire to-be-displayed area before a character train is displayed, or a printing means and/or a display means having a resolution ratio represented by an integer ratio is selected. In the former method, however, a display speed may be decreased and an unnatural space may be formed between characters to be continuously displayed. In the latter method, a degree of freedom of selection for a visualizing means may be decreased or a manufacturing cost of the apparatus may be increased.

SUMMARY OF THE INVENTION

It is an object of the present invention to solve the above conventional problems.

It is another object of the present invention to provide a document processing apparatus comprising a display means for displaying a character train, display control means for forming display position information on the display means in accordance with visualization position information corresponding to a character pitch of the other visualizing means having a resolution different from that of the display means and causing the display means to display the character train on the basis of the formed display position information, a detecting means for detecting that a space is formed between characters to be continuously displayed on the display means due to a difference between the resolutions, a second display control means for closing the space upon detection thereof, and a third display control means for canceling an amount of the closed space in a portion where characters are discontinuous.

It is still another object of the present invention to provide a document processing apparatus in which when display position information on a display means is to be determined in accordance with visualization position information of the other visualizing means having a resolution different from that of the display means, formation of a space between characters to be continuously displayed on the display means caused by a difference between the resolutions is detected to close the space forward, and an amount of the closed space is canceled in a portion where characters are discontinuous, thereby eliminating an inconvenience in which previously displayed data remains in the space portion or preventing formation of an unnatural space or a reduction in display speed.

BRIEF DESCRIPTION OF THE DRAWINGS

FIG. 5 is a flow chart for explaining a display control procedure according to the apparatus; and FIG. 6 is a view for explaining an operation of the apparatus.

DETAILED DESCRIPTION OF THE PREFERRED EMBODIMENTS

An embodiment of the present invention will be described in detail below with reference to the accompanying drawings. Note that the present invention can be applied to a system constituted by a plurality of devices, an apparatus constituted by a single device, or an arrangement in which a program is supplied to a system or an apparatus to achieve the object of the present invention.

Figure 1A:
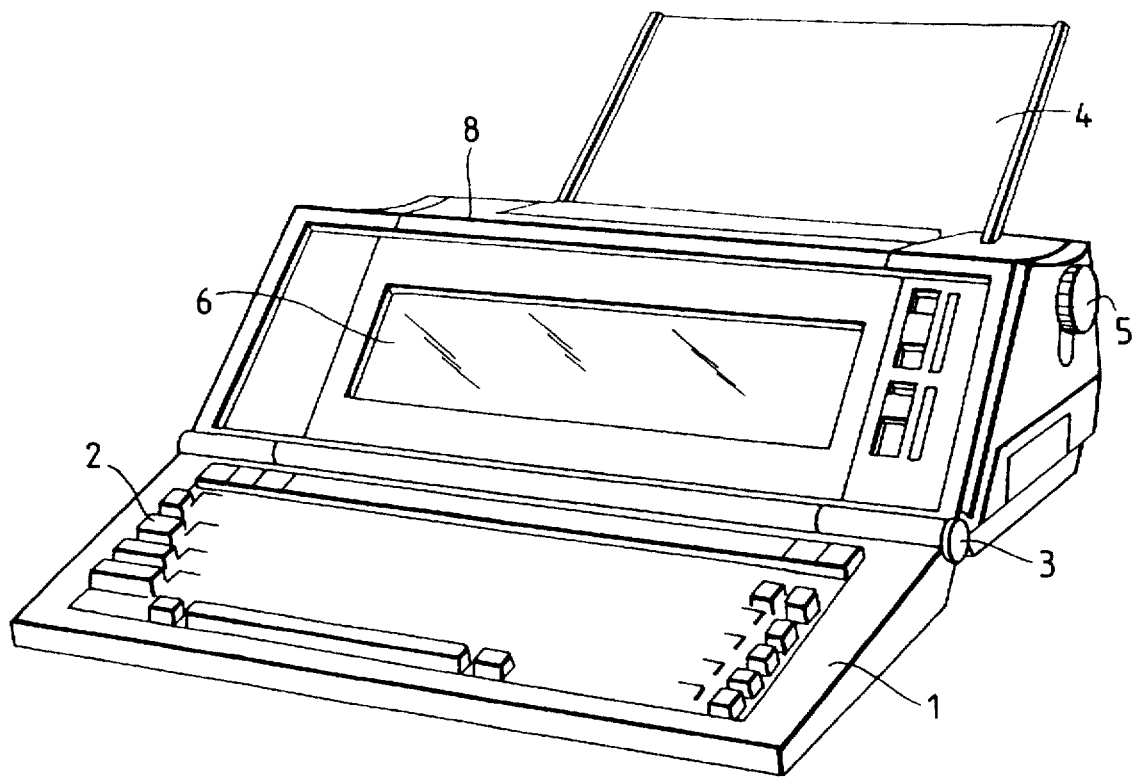
FIGS. 1A and 1B are perspective views showing outer appearances of an electronic typewriter as an apparatus according to an embodiment of the present invention when it is used and housed, respectively.
Figure 1B:
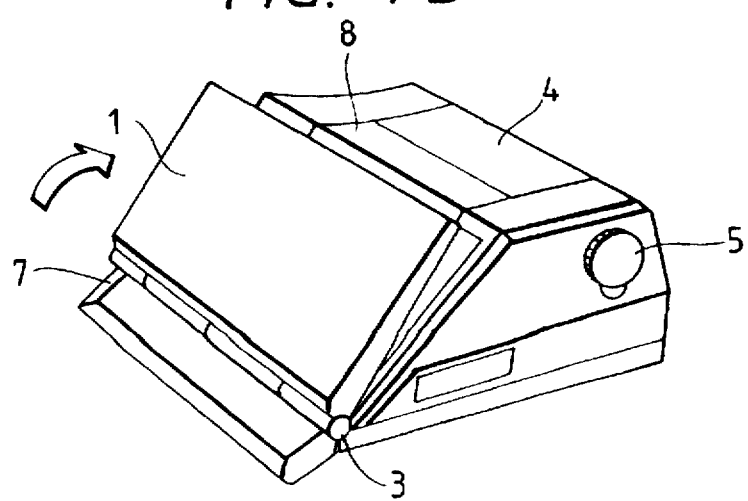

FIGS. 1A and 1B show outer appearances of an electronic typewriter as an apparatus to which the present invention can be applied.

Referring to FIGS. 1A and 1B, a keyboard 1 has keys 2 such as character input keys for inputting characters, numerals, or the like and control keys. When the keyboard 1 is not used, it can be pivoted about a hinge 3 and folded. A paper feed tray 4 feeds a sheet-like recording medium to a printer unit in the apparatus. When the paper feed tray 4 is not used, it is housed to cover the printer unit, as shown in FIG. 1B. The apparatus also includes a knob 5 for manually setting or discharging a recording medium, a display 6 for displaying an input document or the like, and a handle 7 used to carry the apparatus according to this embodiment.

Figure 2:
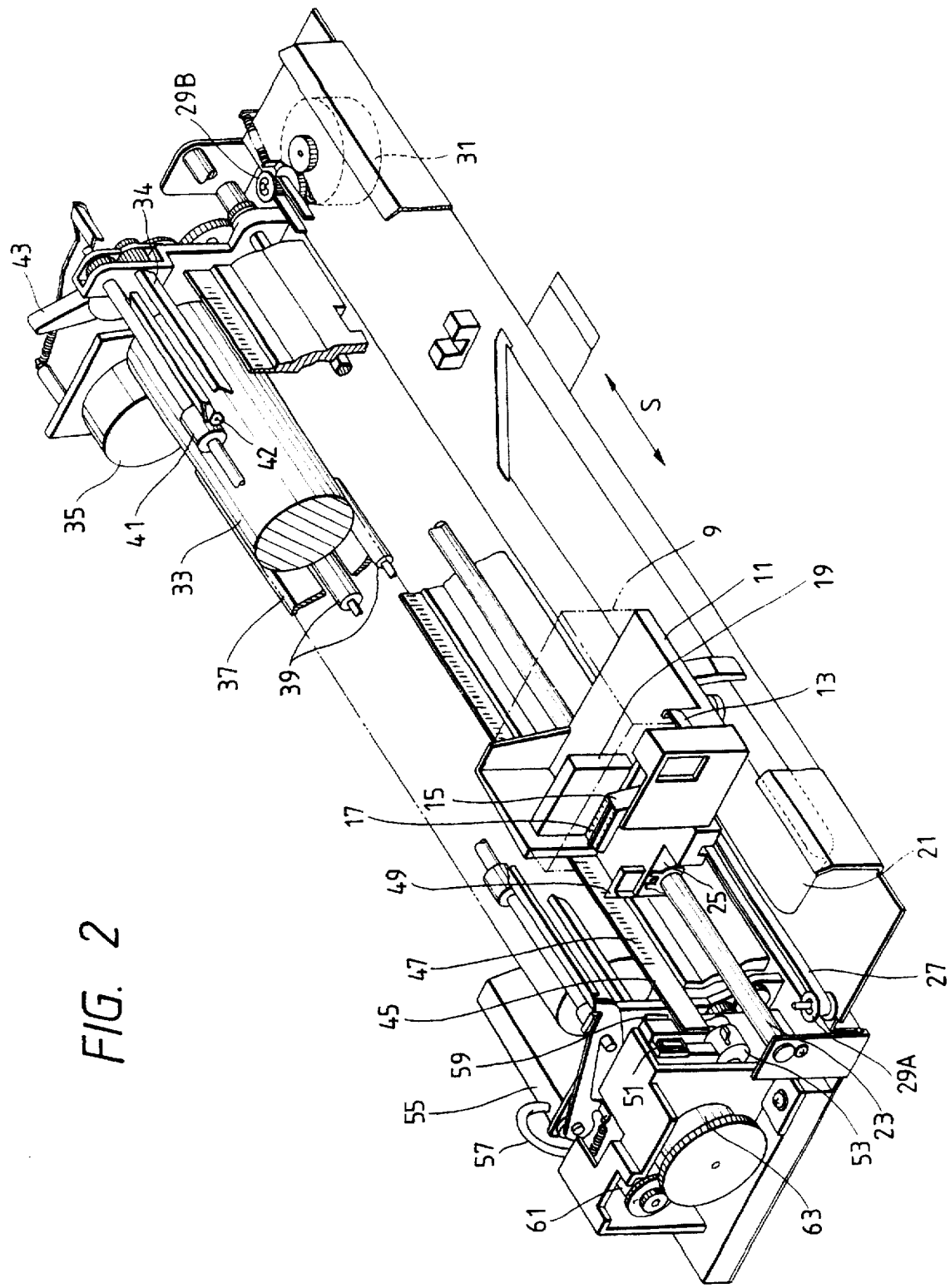
FIG. 2 is a perspective view showing a practical arrangement of a printer unit which can be adopted in the apparatus shown in FIGS. 1A and 1B.

FIG. 2 shows a practical arrangement of the printer unit according to this embodiment.

Referring to FIG. 2, a head cartridge 9 having an ink jet recording head is mounted on a carriage 11, and the carriage 11 performs scanning in a direction indicated by an arrow S. A hook 13 is used to mount the head cartridge 9 on the carriage 11, and a lever 15 is used to manipulate the hook 13. The lever 15 has a marker 17 capable of indicating a scale provided on a cover (to be described later) and reading a print position or a set position for the recording head of the head cartridge. A support plate 19 supports an electrical connection unit with respect to the head cartridge 9. A flexible cable 21 connects the electrical connection unit to a main body control unit.

A guide shaft 23 for guiding the carriage 11 in the direction S is inserted in a bearing 25 of the carriage 11. The carriage 11 is fixed on a timing belt 27 for transmitting power for moving the carriage 11 in the direction S. The timing belt 27 is looped between pulleys 29A and 29B arranged on two sides of the apparatus. A carriage motor 31 transmits driving power to the pulley 29B through a transmission mechanism such as a gear.

A conveyor roller 33 regulates a recording surface of a recording medium (to be also referred to as recording paper hereinafter) and conveys the recording medium upon recording. The conveyor roller 33 is driven by a conveyor motor 35. A paper pan 37 guides the recording medium from the paper feed tray 4 to the recording position. Feed rollers 39 are disposed in a feed path of the recording medium and urge the recording medium against the conveyor roller 33, thereby conveying the recording medium. A platen 34 opposes an ejection port formation surface of the head cartridge 9 and regulates the recording surface of the recording medium. A paper discharge roller 41 is arranged on the downstream side of the recording position in the recording medium conveyance direction and discharges the recording medium toward a discharge port (not shown). A spur 42 is provided in correspondence with the paper discharge roller 41 and urges the roller 41 via the recording medium, thereby allowing the paper discharge roller 41 to generate a recording paper conveyance force. A release lever 43 releases biasing forces of the feed rollers 39, a push plate 45, and the spur 42.

The push plate 45 suppresses floating of the recording medium near the recording position to maintain a contact state of the medium with respect to the conveyor roller 33. In this embodiment, an ink jet recording head for performing recording by ejecting ink is used as the recording head. Therefore, a distance between the ink ejection port formation surface of the recording head and the recording surface of the recording medium is comparatively small, and a gap between the recording medium and the ejection port formation surface must be strictly controlled while the recording medium and the ejection port formation surface are prevented from being brought into contact with each other. For this reason, the use of the push plate 45 is effective. A scale 47 is formed on the push plate 45, and a marker 49 is formed on the carriage 11 in correspondence with the scale. A print position and a set position of the recording head can also be read by these members.

A cap 51 consisting of an elastic material such as rubber opposes the ink ejection port formation surface of the recording head in a home position and is supported to be brought into contact with/separated away from the recording head. The cap 51 is used to protect the recording head in a non-recording state or to perform recording head ejection recovery processing. In this ejection recovery processing, an energy generating element provided inside the ink ejection ports and used for ink ejection is driven to eject ink from all the ejection ports to remove an ejection failure factor such as ink no longer suitable for recording, e.g., ink containing bubbles or dust or thickened ink (pre-ejection), or ink is forcibly discharged from the ejection ports to remove an ejection failure factor independently of the pre-ejection.

A pump 53 generates a suction force for forcibly discharging ink and draws ink contained in the cap 51 by suction upon ejection recovery processing performed by the forcible discharge or the pre-ejection. A waste tank 55 stores waste ink drawn by suction by the pump 53, and a tube 57 allows the pump 53 to communicate with the waste ink tank 55.

A blade 59 performs wiping of the ejection port formation surface of the recording head and is supported to be movable between a position where the blade 59 projects toward the recording head and performs wiping while the head is moved and a withdrawn position where the blade 59 is not engaged with the ejection port formation port. A cam device 63 receives power transmitted from a motor 61 and drives the pump 53 or moves the cap 51 or the blade 59.

Figure 3:
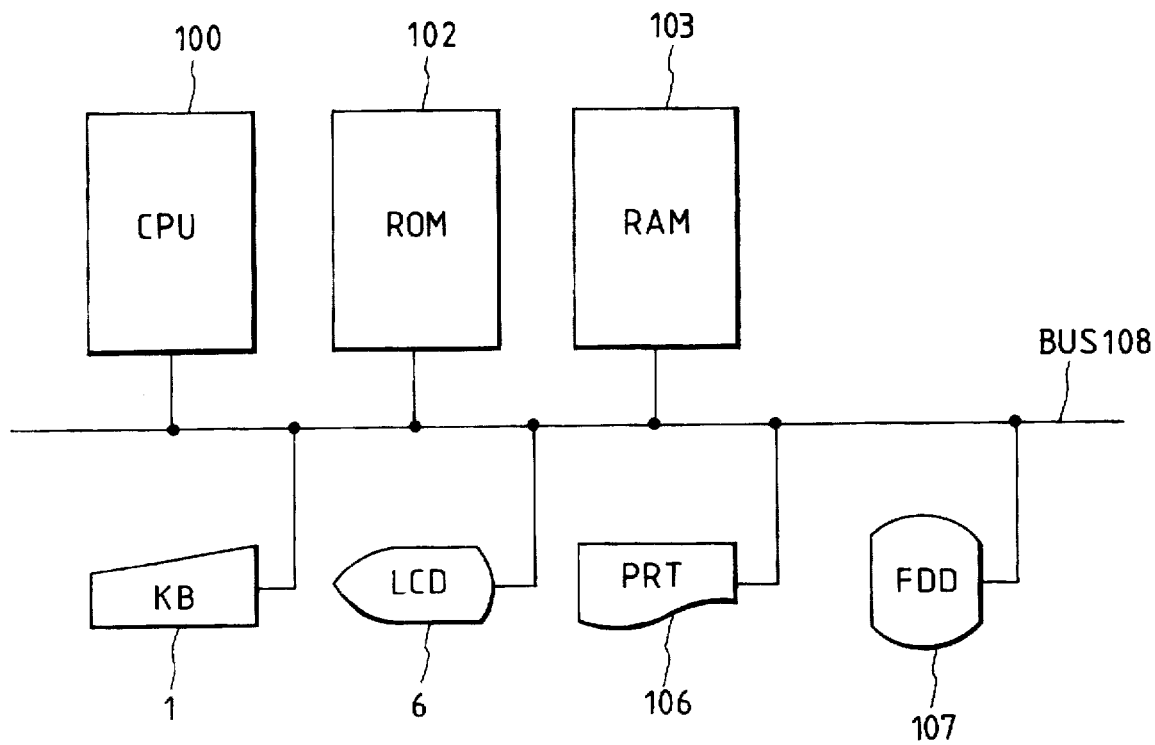
FIG. 3 is a block diagram showing an electrical arrangement of the apparatus according to the embodiment.

FIG. 3 is a block diagram showing a schematic arrangement of the this embodiment.

Referring to FIG. 3, a central processing unit (CPU) 100 of a microprocessor arrangement constitutes a central portion of this embodiment and controls the respective constituting parts via a bus 108 in accordance with processing procedures (to be described later). The CPU 100 executes an arithmetic operation or logical determination for processing document information or print information. The bus 108 includes an address bus for transferring an address signal, a control bus for transferring a control signal, and a data bus for transferring various types of data.

A read only memory (ROM) 102 stores microinstructions required to sequentially supply a control procedure as shown in FIG. 5 to the CPU 100 when the CPU 100 supplies a control signal to each part to be described below, and stores character dot patterns and the like for use in actual printing.

A rewritable random access memory (RAM) 103 has areas for storing operation states of the respective devices.

Figure 4:
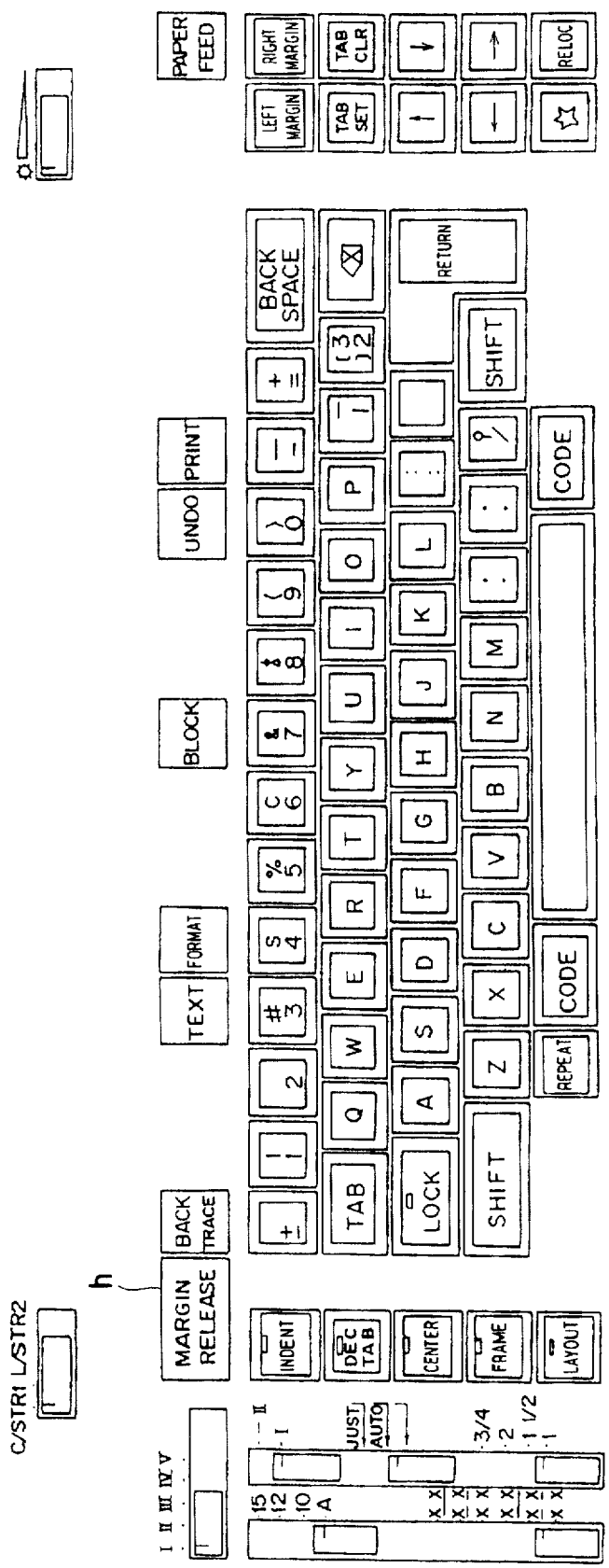
FIG. 4 is a plan view showing a practical arrangement of a keyboard of the apparatus.

The keyboard (KB) 1 for inputting characters or function codes has function keys required to move the carriage, determine a print start position, edit a document, or perform printing, as shown in FIG. 4.

Although a liquid crystal display device is used as the display 6 in this embodiment, the display 6 may be a display device using a cathode-ray tube, a light-emitting diode, or a phosphor display. The display 6 is used to visually display the print start position or display a document edit screen. In addition, although the ink jet printer is used as a printer 106 in the above embodiment, a daisy wheel type or thermal transfer type printer may be used.

FIG. 5 shows a display control processing procedure according to the above embodiment, and FIG. 6 is a view for explaining an operation of the embodiment. A display control operation of this embodiment will be described below with reference to FIGS. 5 and 6. In FIGS. 5 and 6, reference symbols have the following meanings:

P : print position information
Pa: display position information to be given
W : print character pitch (print character width)
Wa: display character pitch (display character width)
In this embodiment, W=36 and Wa=7, and therefore print resolution: display resolution =5:1. In addition, P and Pa have the following values:

P: 0, 36, 72, 108, 144, 180, . . .
Pa: 0, 7, 14, 21, 28, 36, . . .

When the procedure shown in FIG. 5 is started, a display character train is developed in a display character train buffer (which may be an area in the RAM 103) provided in correspondence with a display area of the display 6 in step S1. Addresses in the display character train correspond to display positions on the display 6, and the display character train is stored in the display character train buffer in correspondence with the display position Pa. The display position Pa is given as an integral part of a value obtained by dividing the print position information P by "5". Note that the print position information includes print position information edited by the document processing apparatus, e.g., print position information subjected to processing such as proportional, justification, and centering. These pieces of information are also managed as data concerning output dot positions. Note that an attribute (type face or inversion) of each character may be stored in correspondence with the character.

In step S3, initialization for parameters and the like to be used is performed as follows. That is, in this embodiment, a parameter Pr for indicating a display position of an immediately preceding character is set to be "-Wa", and a data read pointer of the buffer is set in a start address of the buffer.

Subsequently, in step S5, an address (display position Pa), character information, and an attribute of one character are supplied from the display character train buffer and subjected to the following processing as Pt, chr, and M, respectively.

In step S7, it is checked whether the input character code indicates the end of the line. If Y (YES) in step S7, the procedure is ended. If N (NO) in step S7, the flow advances to step S9, and it is checked whether the character to be displayed is blank. If Y in step S9, a blank detection flag (which can be set in the RAM 103) is turned on in step S11. If N in step S9, the flow immediately advances to step S13.

In step S13, the value Pr indicating an immediately preceding position and the display character pitch Wa are subtracted from Pt to obtain a value G. This value G is "0" when the display position information Pa given as shown in FIG. 6 is "0", "7", . . . , "28"; "1" when Pa is "36", "43", . . . , "64"; and "2" when Pa is "72" and "79". In step S15, the character chr is displayed with the attribute M at a position obtained by subtracting G from Pt. If the character chr is a blank code, the position is naturally blanked. Even if a space is formed during display, subsequent characters are closed forward by an amount corresponding to the space as shown in FIG. 6.

Subsequently, in step S17, whether a blank detection flag is ON is checked. If N in step S17, the flow advances to step S19 to set Pr to be (Pt−G). Thereafter, a code read pointer of the display character train buffer is incremented by one in step S21, and the flow returns to step S5 to read out the next character.

If Y is determined in step S17, the flow advances to step S23, and an amount (an amount of G) corresponding to the space closed forward subsequently to the blank character is provided with blank. Pr is set to be Pt in step S25, the blank detection flag is turned off in step S27, and the flow advances to step S21. In this case, Pr is set to be Pt in step S25 because the amount closed forward is canceled by providing the portion subsequent to the blank character with blank.

As described above, according to the embodiment of the present invention, when it is detected that a space portion is formed between characters to be continuously displayed, the space is closed, and an amount of the closed space is canceled by a portion in which a blank is displayed. Therefore, an inconvenience in which previously displayed data remains in the space portion can be prevented. In addition, unlike when processing of blanking a to-be-displayed area is performed beforehand by a main controller or a higher order routine, an unnatural space is not formed between characters or a processing speed is not decreased. Also, a degree of freedom of selection for a visualizing means is not decreased.

Although the present invention is applied to an electronic typewriter in the above embodiment, the present invention can be applied to another apparatus.

For example, when the present invention is to be applied to a document processing apparatus for processing a language in which no blank is present between words, i.e., Japanese, the above canceling may be performed by using a portion where characters do not continue, e.g., a period or a comma.

As has been described above, according to the present invention, when display position information on a display means is to be determined in accordance with visualization position information from the other visualizing means having a resolution different from that of the display means, it is detected that a space is formed between characters to be continuously displayed on the display means due to a difference between the resolutions, and this space portion is closed forward. In addition, since an amount to the closed space is canceled in a portion where characters are discontinuous, an inconvenience in which previously displayed data remains in this space portion, formation of an unnatural space, and a reduction in display speed can be prevented.

What is claimed is:

1. A document processing apparatus and a visualizing means, said visualizing means for generating image data using visualization position information, the visualization position information representing positions at which the data is to be generated by said visualizing means, said apparatus comprising:

display means for displaying a character train, said visualizing means having a resolution different from that of said display means, wherein the character train comprises a plurality of words;

generating means for generating display position information on said display means on the basis of the visualization position information and corresponding to a character pitch of the visualizing means;

detecting means for detecting a misalignment between the display information and the visualization position information due to the difference in resolution between said display means and said visualizing means, for each character forming each of the plurality of words; and control means for, if the misalignment is detected for one of the plurality of words by said detecting means, controlling the arrangement of characters forming the one word subsequent to the misalignment such that the misalignment is eliminated.

2. An apparatus according to claim 1, wherein said generating means generates the display position information so as to modify a space formed between characters displayed by said display means to compensate for the difference between the resolutions.

3. An apparatus according to claim 2, wherein said generating means effects correspondence such that the space to be modified is eliminated or decreased by placement of the punctuation.

4. An apparatus according to claim 1, wherein said generating means generates the display position information by dividing the visualization position information by a value corresponding to a ratio between the resolutions.

5. An apparatus according to claim 1, wherein the visualizing means comprises printing means.

6. An apparatus according to claim 5, wherein said printing means comprises a printer for causing a volume change in ink by an effect of heat energy to eject the ink.

7. An apparatus according to claim 1, wherein the character train is constituted by characters to be printed.

8. A document processing method comprising the steps of:

displaying a character train, wherein the character train comprises a plurality of words;

generating display position information on a display means on the basis of visualization position information and corresponding to a character pitch of a visualizing means, the visualization position information representing positions at which the data is to be generated by the visualizing means, the visualizing means having a resolution different from that of the display means;

detecting a misalignment between the display information and the visualization position information due to the difference in resolution between said display means and said visualizing means, for each character forming each of the plurality of a words; and controlling, if misalignment for one of the plurality of words is detected in said detecting step, the arrangement of characters forming the one word subsequent to the misalignment such that the misalignment is eliminated.

9. A method according to claim 8, wherein the display position information is generated so as to modify a space formed between characters displayed in said displayed step to compensate for the difference between the resolutions.

10. A method according to claim 9, wherein correspondence is effected such that the space to be modified is eliminated or decreased by placement of the punctuation.

11. A method according to claim 8, wherein in said generating step the display position information is generated by dividing the visualization position information by a value corresponding to a ratio between the resolutions.

12. A method according to claim 8, wherein the visualizing means comprises printing means.

13. A method according to claim 12, wherein the printing means comprises a printer for causing a volume change in ink by an effect of heat energy to eject the ink.

14. A method according to claim 8, wherein the character train is constituted by character to be printed.

15. A document processing apparatus comprising:

first output means for outputting information in a first resolution;

second output means for outputting information in a second resolution lower than the first resolution;

memory means for storing information comprising a plurality of character trains, each of the plurality of character trains comprising a plurality of words;

detecting means for detecting a misalignment between the display information and the visualization position information due to the difference in resolution between said first output means and said second output means, for each character forming each of the plurality of words;

first control means for, if the misalignment is detected for one of the plurality of words by said detecting means, controlling the arrangement of characters forming the one word subsequent to the misalignment such that the misalignment is eliminated; and second control means for sending the information controlled by said first control means to said second output means.

16. An apparatus according to claim 15, wherein said first output means comprises a printing device and said second output means comprises a display device.

17. An apparatus according to claim 16, wherein said printing device prints information by ejecting ink.

18. A document processing apparatus, a display device and a printing device, said document processing apparatus comprising:

position changing means for changing a position on said display device at which position a character is to be displayed, by a dot unit of said display device, wherein said display device displays information in a first resolution;

memory means for storing information to be sent to said printing device which prints information in a second resolution higher than the first resolution, the information comprising a character train, and the character train comprising a plurality of words;

detecting means for detecting a misalignment between the display information and the visualization position information due to the difference in resolution between said display device and said printing device, for each character forming each of the plurality of words; and control means for, if the misalignment is detected for one of the plurality of words by said detecting means, controlling the arrangement of characters forming the one word subsequent to the misalignment such that the misalignment is eliminated.

19. An apparatus according to claim 18, wherein the information stored in said memory means comprises a plurality of character trains and spaces between adjacent character trains of the plurality of character trains and wherein said correction means corrects the misalignment by increasing or decreasing such spaces by a dot unit.

20. An apparatus according to claim 18, wherein the printing device prints information by ejecting ink.

* * * * *